United States Patent [19]

Kamuro

[11] Patent Number: 5,109,334
[45] Date of Patent: Apr. 28, 1992

[54] MEMORY MANAGEMENT UNIT CAPABLE OF EXPANDING THE OFFSET PART OF THE PHYSICAL ADDRESS

[75] Inventor: Setsufumi Kamuro, Matsudo, Japan

[73] Assignee: Sharp Kabushiki Kaisha, Osaka, Japan

[21] Appl. No.: 262,861

[22] Filed: Oct. 26, 1988

[30] Foreign Application Priority Data

Oct. 27, 1987 [JP] Japan .................. 62-270600

[51] Int. Cl.⁵ ........................................ G06F 12/10
[52] U.S. Cl. .......................... 395/400; 364/247.5; 364/255.1; 364/255.5; 364/256.5; 364/DIG. 1
[58] Field of Search ... 364/200 MS File, 900 MS File, 364/200, 900

[56] References Cited

U.S. PATENT DOCUMENTS

| 3,725,874 | 4/1973 | Van Heel | 364/200 |
|---|---|---|---|
| 4,035,779 | 7/1977 | Birney et al. | 364/200 |
| 4,037,207 | 7/1977 | Birney et al. | 364/200 |
| 4,037,215 | 7/1977 | Birney et al. | 364/200 |
| 4,042,911 | 8/1977 | Bourke et al. | 364/200 |
| 4,163,280 | 7/1979 | Mori et al. | 364/200 |
| 4,251,860 | 2/1981 | Mitchell et al. | 364/200 |
| 4,296,468 | 10/1981 | Bandoh et al. | 364/200 |
| 4,319,322 | 3/1982 | Allain et al. | 364/200 |
| 4,385,352 | 5/1983 | Bienvenu | 364/200 |
| 4,432,053 | 2/1984 | Gaither et al. | 364/200 |
| 4,442,484 | 4/1984 | Childs, Jr. et al. | 364/200 |
| 4,453,212 | 6/1984 | Gaither et al. | 364/200 |
| 4,473,878 | 9/1984 | Zolnowsky et al. | 364/200 |
| 4,761,737 | 8/1988 | Duvall et al. | 364/300 |
| 4,785,398 | 11/1988 | Joyce et al. | 364/200 |
| 4,847,748 | 7/1989 | Yamahata et al. | 364/200 |

OTHER PUBLICATIONS

S. Kamuro et al., in 16-bit Microprocessors, Chapter 2, pp. 139-141 (Maruzen, 1983).
The Z8000 Microprocessor: A Design Handbook, Chap. 9, Bradly K. Fawcett, pp. 152-171.

Primary Examiner—Gareth D. Shaw
Assistant Examiner—Matthew C. Fagan
Attorney, Agent, or Firm—Morrison & Foerster

[57] ABSTRACT

A memory management unit in which logical addresses are translated into physical addresses is provided that comprises a segment register section that is composed of a plurality of segment registers; a segment address decoder for selecting a desired segment register in the segment register section; and an effective-address selection register from which an effective address for the desired segment register is fed to the segment address decoder. A part of the logical address is used as the effective address and the remaining part of the logical address is used as an expanded part of the physical address.

3 Claims, 5 Drawing Sheets

MEMORY MANAGEMENT UNIT CAPABLE OF EXPANDING THE OFFSET PART OF THE PHYSICAL ADDRESS

BACKGROUND OF THE INVENTION

1. Field of the Invention

This invention relates to a memory management unit for microprocessors, and more particularly, to a circuit configuration of the memory management unit in which logical addresses are translated into physical addresses.

2. Description of the Prior Art

As an example of conventional memory management units, FIG. 4 shows a block diagram of a Zilog in U.S.A.); see S. Kamuro et al., in 16-*bit Microprocessors*, Chap. 2, pp. 75-155 (Maruzen, 1983). In this figure, reference numeral 1 is a 23-bit logical address transferred from the central processing unit (CPU) that is not shown therein. Reference numeral 2 is a data bus through which 16-bit data is transferred from the CPU to the memory management unit 3 in which logical addresses are translated into physical addresses. Also, reference numeral 4 is a 24-bit physical address; reference numeral 5 is a 16-bit offset address that is a part of the logical address 1 transferred from the CPU; and reference numeral 6 is a 7-bit segment number that is a part of the logical address 1 transferred from the CPU. Moreover, reference numeral 7 is a segment register section that is composed of a plurality of 16-bit segment registers. The address data to be stored in these segment registers is transferred from the CPU through the data bus 2. The segment register in the segment register section 7 is selected according to the 7-bit segment number 6. The 16-bit output data from the selected segment register is placed in a base address register 9. The leftmost 8 bits (A8-A15) of the 16-bit offset address 5 are stored in a temporary register 8. The 8bit output data from the temporary register 8 is added to the 16-bit output data from the base address register 9 by means of an adder 10 to form the leftmost 16 bits of the 24-bit physical address 4, resulting in a segment address 12 in the physical address space. The rightmost 8 bits (A0-A7) of the offset address 5 is used as the rightmost 8 bits of the 24-bit physical address 4, resulting in an offset address 11 within each segment.

FIG. 5 shows a block diagram of another conventional memory management unit that has a great deal of flexibility in the circuit configuration as compared with the memory management unit of FIG. 4. Although the memory management unit of FIG. 5 has a circuit configuration to treat 8-bit data, the basic configuration of the memory management unit for treating 16-bit data or other data with different bit lengths is the same as that shown in FIG. 5. In FIG. 5, reference numeral 101 is a 16-bit logical address transferred from the CPU; reference numeral 102 is an 8-bit data transferred from the CPU; and reference numeral 103 is an address translation unit in which the logical address 101 is translated into the 19-bit physical address 104 to specify the actual memory address. Also, reference numeral 105 is a segment address decoder by which any one of $2^5(=32)$ segment registers in the segment register section 106 is selected according to the leftmost 5 bits (A11-A15) of the logical address 101. The 8-bit output data from the selected segment register gives the leftmost 8 bits of the physical address 104, resulting in a segment address 109 in the physical address space. The rightmost 11 bits (A0-A10) of the logical address 101 are used as the rightmost 11 bits of the physical address 104, resulting in an offset address 108 within each segment. Moreover, reference numeral 107, which is not shown definitely in FIG. 5, is a logical operation unit in which some type of logical operation is performed between the output data from the segment register and all or part of the lower address of the logical address 101 transferred from the CPU. The logical operation unit 107 may be any type of logical operation unit, and may be, for example, an adder of the same type as shown in FIG. 4.

In such a conventional addressing arrangement, when a certain segment address is selected in the physical address space, the range of offset address that can be selected freely within each segment according to the address data from the CPU is limited to a fixed range that is determined by the lower part of the physical address. For example, the offset address range contains only $2^8(=256)$ addressable locations in the case of the memory management unit shown in FIG. 4, and only $2^{11}(=2048)$ addressable locations in the case of the memory management unit shown in FIG. 5. This limitation of the offset address range within each segment results in a great number of restrictions on the application of such a memory management unit and on the use of microprocessors.

SUMMARY OF THE INVENTION

The memory management unit of this invention, which overcomes the above-discussed and numerous other disadvantages and deficiencies of the prior art, comprises a segment register section that is composed of a plurality of segment registers; a segment address decoder for selecting a desired segment register in the segment register section; and an effective-address selection register from which an effective address for the desired segment register is fed to the segment address decoder, wherein a part of the logical address is used as the effective address and the remaining part of the logical address is used as an expanded part of the physical address.

In a preferred embodiment, each bit of the effective-address selection register can be set to either bit data of the logical address or bit data of a fixed level selected from logic-0 and logic-1.

Thus, the invention described herein makes possible the objectives of (1) providing a memory management unit with great practical value in which the number of segment registers available at a time can be changed to expand the offset address range within each segment in the physical address space; and (2) providing a memory management unit with great practical value by which the offset address range within each segment in the physical address space can be changed freely according to the application thereof.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The memory management unit of this invention, in which logical addresses transferred from the CPU are translated into physical addresses that specify the locations in various memories, is provided with an effective-address selection register. In the effective-address selection register, there is placed a part of the logical address as an effective address for the selection of a segment register. The remaining part of the logical address can be used as a non-effective address for expanding the physical address space. The non-effective address is combined with the original offset address, resulting in an expanded offset address.

For example, when the leftmost 3 bits (A13-A15) in the effective-address selection register are used as an effective address, the remaining 2 bits (A11-A12) are independent of the selection of a segment register. Thus, these 2 bits (A11-A12) that constitute a non-effective address can be used as an expanded part of the appropriate physical address. As a result, the original offset address with a length of 11 bits is expanded into an offset address with a length of 13 bits, and the range of offset address within each segment, which can be determined directly by means of an address data from the CPU, is increased by four times from $2^{11}(=2048)$ addressable locations to $2^{13}(=8192)$ addressable locations.

In such a case, only $2^3(=8)$ of $2^5(=32)$ segment registers can be used, indicating that there is a lowering in the function of the memory management unit. However, some applications require fewer segment registers than those mentioned above. Therefore, the effective-address selection register should be appropriately set by considering a balance between the number of segment addresses to be used and the range of offset address.

EXAMPLE 1

Figure 1:
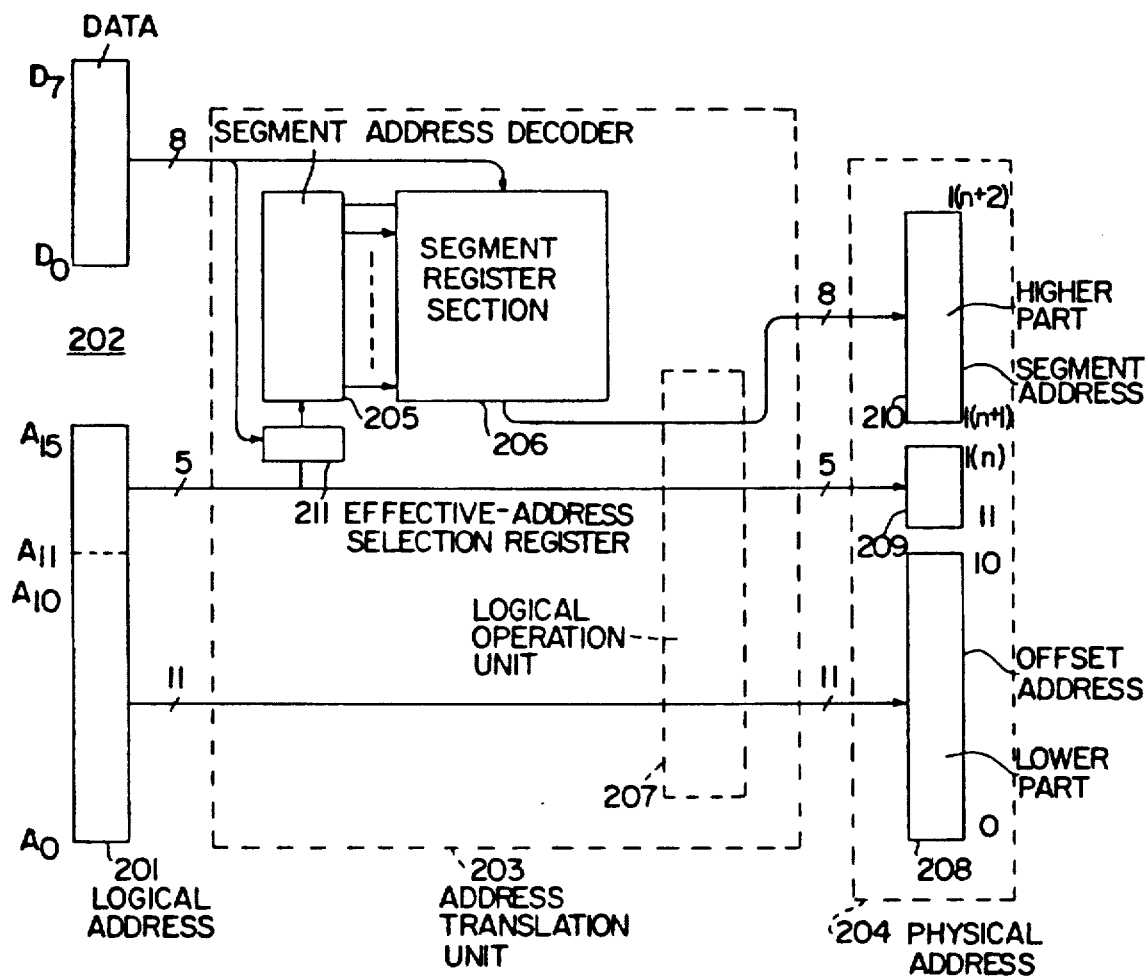
FIG. 1 is a block diagram of one example of the memory management unit according to this invention.

FIG. 1 shows a block diagram of one example of the memory management unit according to this invention. The memory management unit of FIG. 1 comprises an effective-address selection register 211 in the input portion of the segment address decoder 205. In this example, for the leftmost 5 bits of the logical address 201, a part of the 5 bits are fed to the segment address decoder 205 as an effective address for the selection of a segment resister, and the remaining part of the 5 bits are used as an expanded part 209 of the physical address 204.

Figure 2:
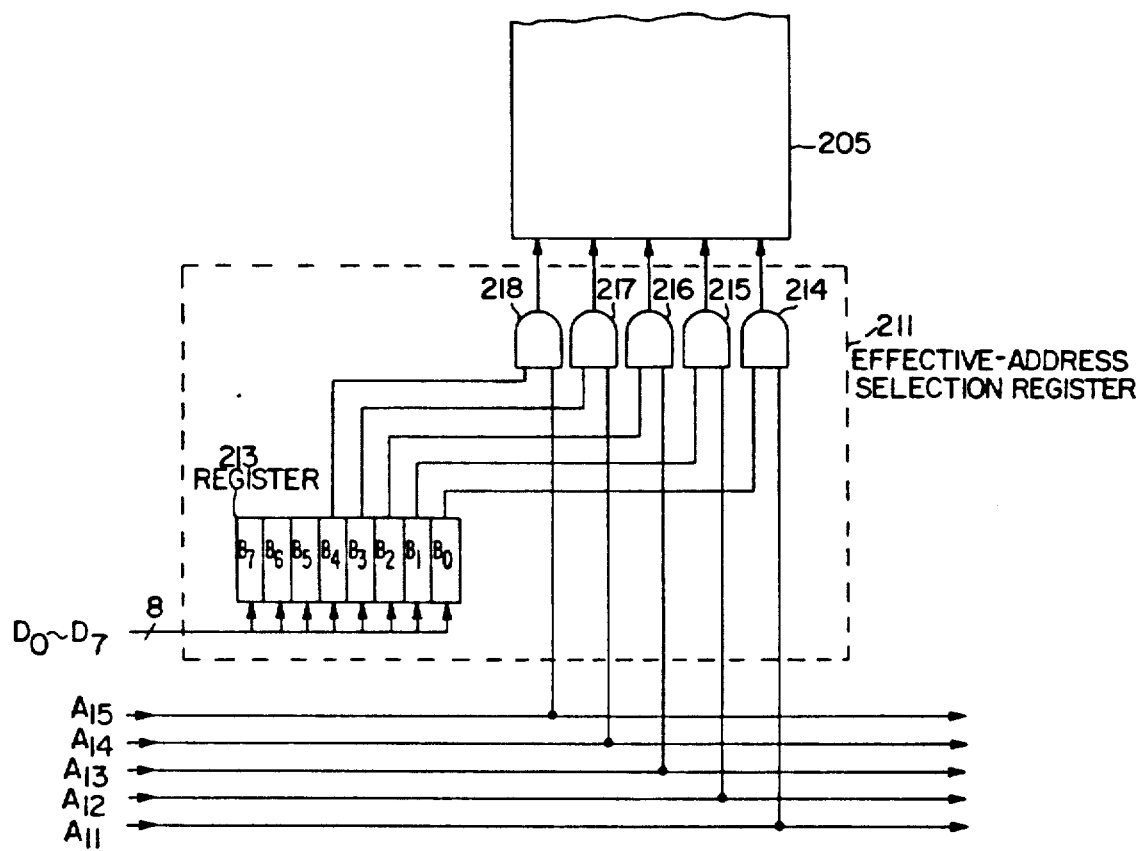
FIG. 2 is a detailed block diagram of one example of the effective-address selection register shown in FIG. 1.

FIG. 2 shows one example of the effective-address selection register 211 for the segment address decoder 205 shown in FIG. 1. The effective-address selection register 211 has a register 213 with a length of 8 bits corresponding to the number of bits in the data bus. The register 213 has the predetermined data beforehand. Because address data with a length of 5 bits is used to select a desired segment resister in the segment register section 206 of FIG. 1, only the rightmost 5 bits (B0-B4) of the bit data in the register 213 are effective for the selection of a segment register, and the remaining bits (B5-B7) are not required therefor. When address data with a length of 9 bits or more is used to select a segment register, the register 213 has preferably, but does not necessarily have the same number of bits as that of the address data.

In FIG. 2, reference numerals 214-218 are 2-input AND gates, respectively. Only 2-input AND gates corresponding to the bit data in the register 213 that has been set to logic-1 are in the "on-state," and only the address data corresponding to the AND gates in the "on-state" is fed to the segment address decoder 205. In contrast, 2-input AND gates corresponding to the bit data in the register 213 that has been set to logic-0 are in the "off-state," and the address data to be fed to the segment address decoder 205 is always in the state of logic-0 independently of the address data from the CPU corresponding to these AND gates in the "off-state".

That is, the bit data that has been set to logic-1 in the register 213 is fed to the segment address decoder 205 as a signal for the selection of a segment register. On the other hand, the leftmost bits A11-A15 of the logical address 201 are transferred from the memory management unit to expand the offset address that is originally defined as an 11-bit address. The non-effective address, which is a part of the logical address 201 and does not contribute to the selection of a segment register, is utilized for expanding the physical address.

EXAMPLE 2

Figure 3:
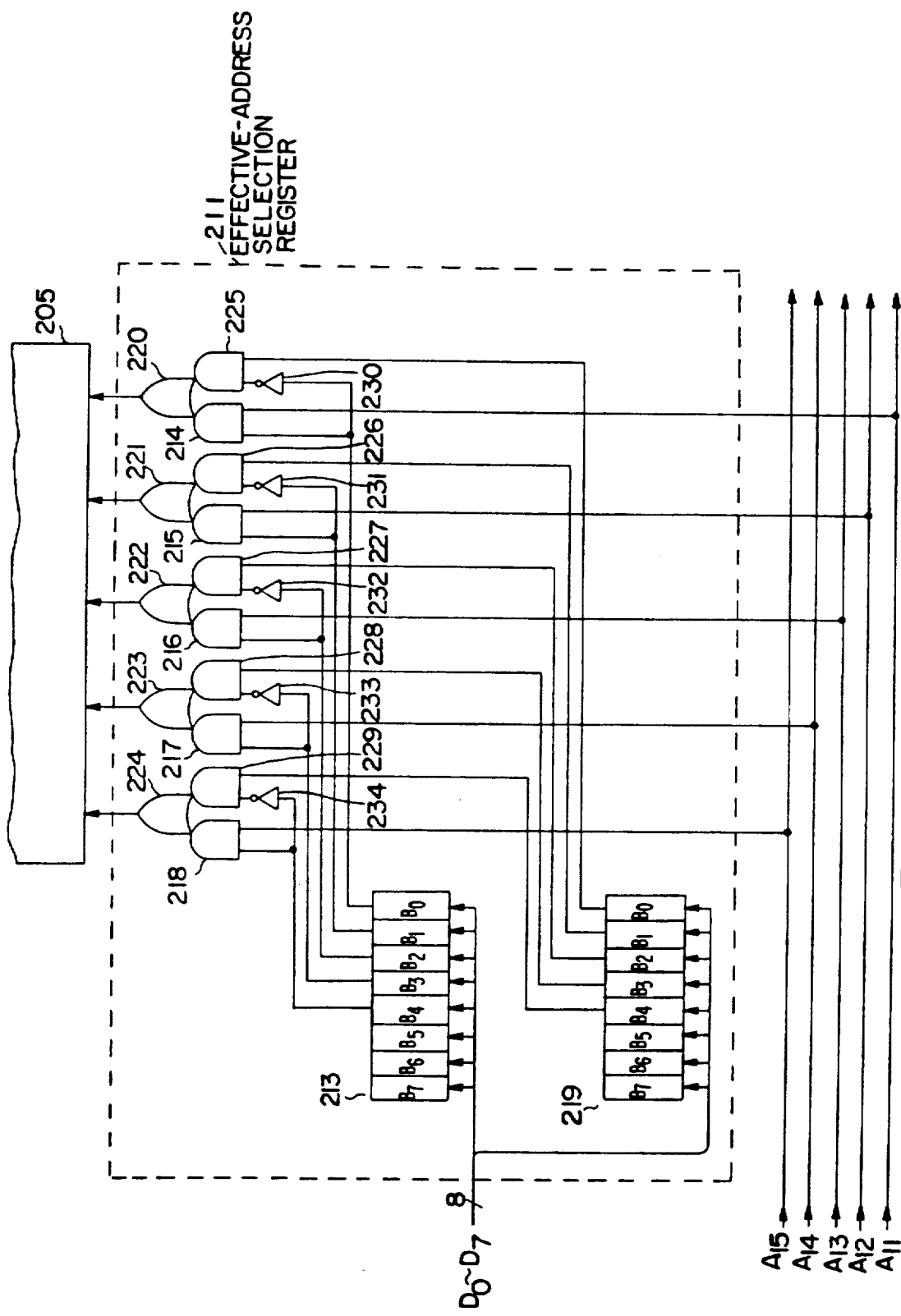
FIG. 3 is a detailed block diagram of another example of the effective-address selection register shown in FIG. 1.
Figure 4:
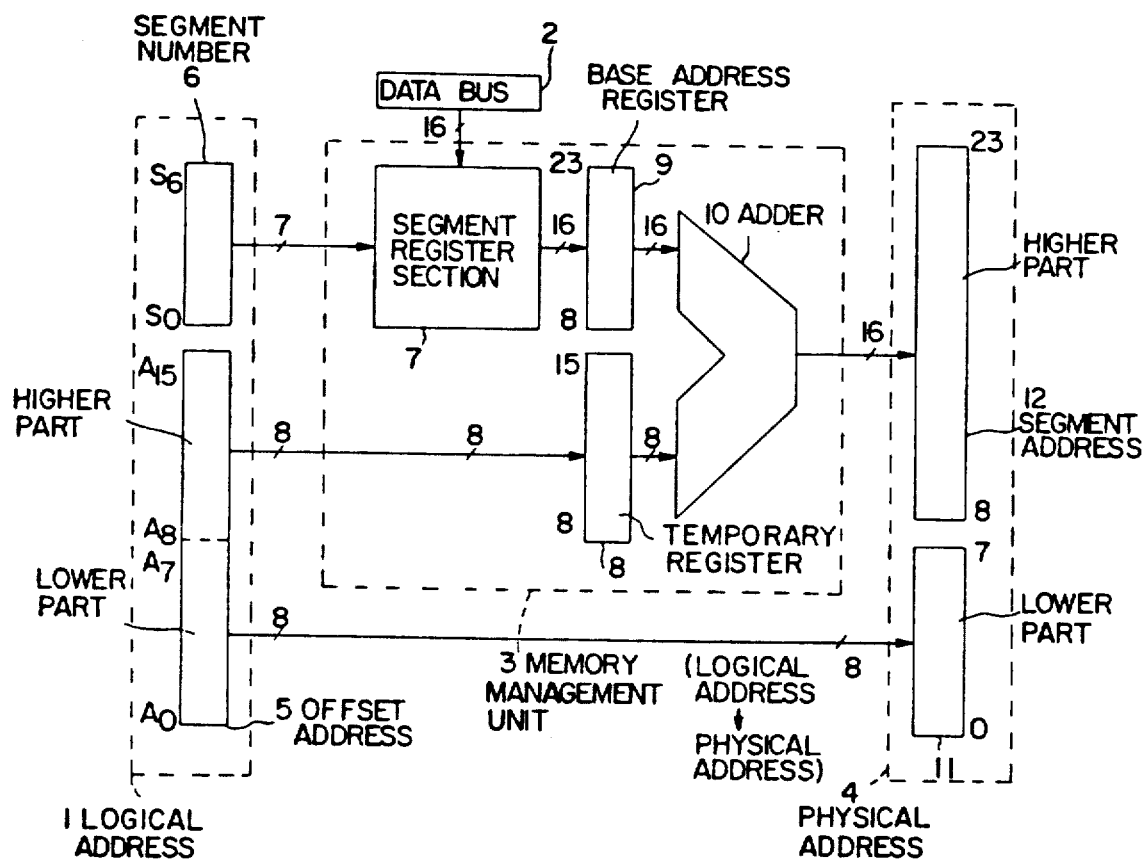
FIGS. 4 and 5 are block diagrams of conventional memory management units.
Figure 5:
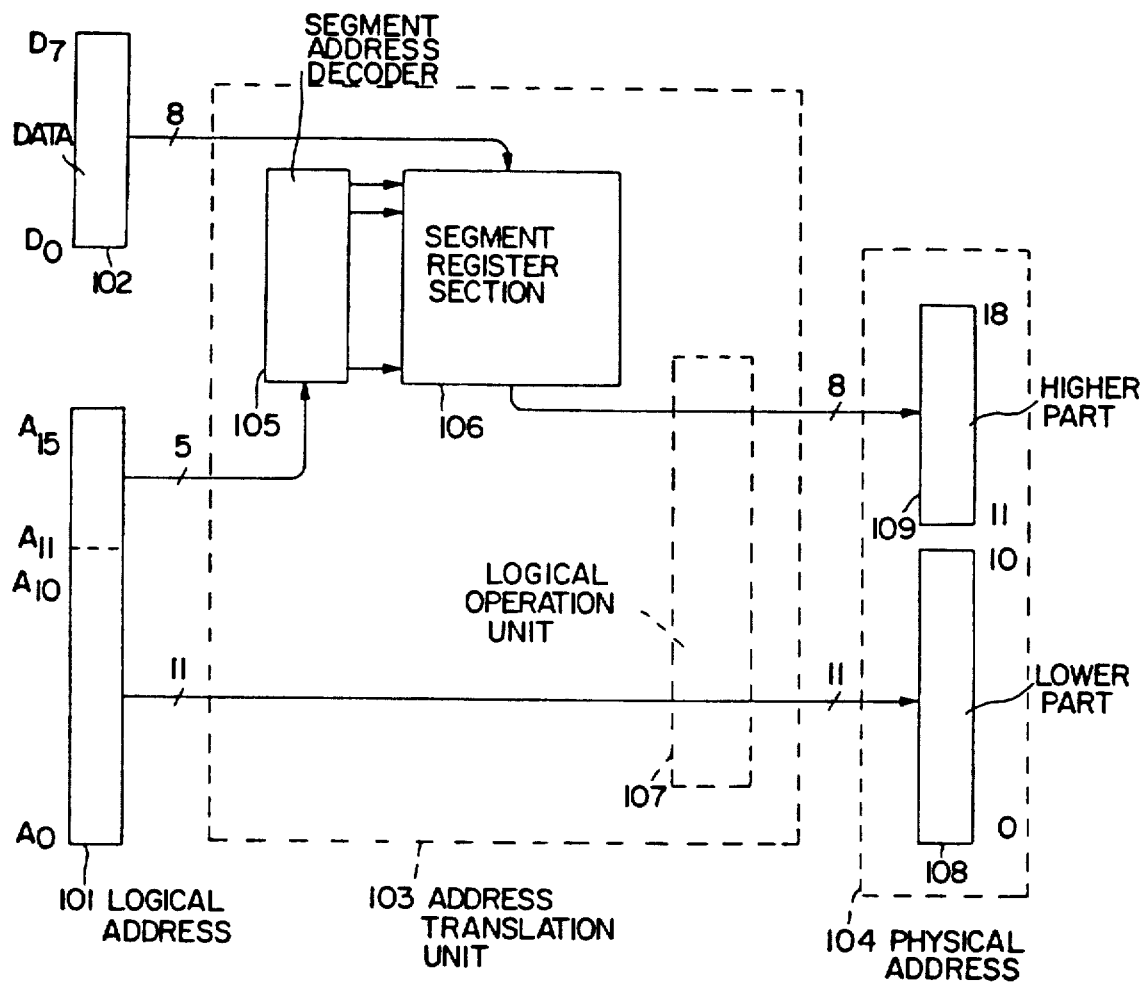

FIG. 3 shows another example of the effective-address selection register for the segment address decoder 205 shown in FIG. 1. As shown in FIG. 3, the effective-address selection register 211 is provided with a register 213 that is connected to the same data bus as in Example 1. The address data corresponding to the bit data in the register 213 that has been set to logic-1 can be used as an input data into the segment address decoder 205. In contrast, the address data corresponding to the bit data in the register 213 that has been set to logic-0 can not be used as an input data in the segment address decoder 205, and this address data is independent of the segment address decoder 205. Therefore, the latter address data can be used as an expanded part of the offset address in the physical address space. In the effective-address selection register 211 of FIG. 2, the non-effective address data that is corresponding to the bit data in the state of logic-0 in the register 213 is always in the state of logic-0. In contrast, the effective-address selection register 211 of FIG. 3 has a second register 219 in addition to the first register 213, and the input level of the non-effective address can be set freely to either logic-0 or logic-1.

That is, in this example, both the first register 213 and the second register 219 are connected to the data bus lines D0-D7 through which input signals are fed to these registers, and output signals from these registers are fed to the segment address decoder 205 through a logical circuit comprising two AND gates and one OR gate for each bit, so that the input level of the non-effective address can be set freely to either logic-0 or logic-1 according to the state of the second register 219.

When the first register 213 is set in such a manner that B0="0", B1="0", B2="1", B3="1", and B4="1", and when the second register 219 is set in such a manner that B0="1" and B1="0", the output signal of the OR gate 220 is in the state of "1", which is the same as the bit data stored in the bit B0 of the second register 219. Also, the output signal of the OR gate 221 is in the state of "0", which is the same as the bit data stored in the bit B1 of the second register 219. Moreover, the output signal of each of the OR gates 222, 223, and 224 is the same as that of the bits A13, A14, and A15 of the logical address, respectively.

The memory management units described in the above-mentioned examples are improved in that a non-effective address, which is a part of the logical address and is not used as an effective address for the segment address decoder, can be utilized for expanding the physical address.

As described above, according to this invention, the offset address range within each segment in the physical address space can be readily expanded by limiting the number of segment registers to be used. Moreover, the offset address range can be changed freely according to the application of the memory management unit. Therefore, the memory management unit of this invention is quite useful for practical use.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A memory management unit in which a logical address is translated into a physical address, said memory management unit comprising:

a segment register section means which includes a plurality of segment registers;

an effective-address selection register means for receiving a predetermined part of said logical address, for dynamically selecting an effective part of said predetermined part, and for producing address data using said effective part; and a segment address decoder means, connected to said effective-address selection register means and said segment register section means, for selecting one of said plurality of segment registers in said segment register section means by decoding said address data produced by said effective-address selection register means; whereby said physical address comprises an output of said selected one segment register, the remaining part of said predetermined part other than said effective part, and the remaining part of said logical address other than said predetermined part.

2. The memory management unit according to claim 1, wherein said effective-address selection register means comprises a register means for storing data which determines said effective part, and a selection means, connected to said register means, for setting a first part of said address data with said effective part and for setting the remaining part of said address data other than said first part with fixed data.

3. The memory management unit according to claim 1, wherein said effective-address selection register means comprises a first register means for storing data which determines said effective part, a second register means for storing predetermined data, and a selection means, connected to said first register means and said second register means, for setting a first part of said address data with said effective part and for setting the remaining part of said address data other than said first part with said predetermined data stored in said second register means.

* * * * *